(12) United States Patent
Reed et al.

(10) Patent No.: US 11,460,284 B1
(45) Date of Patent: Oct. 4, 2022

(54) DIGITAL LINEAR MEASURING DEVICE

(71) Applicant: Reekon Tools Inc., East Boston, MA (US)

(72) Inventors: Christian Reed, Chelsea, MA (US); Konstantinos Oikonomopoulos, Boston, MA (US); Colton Black, Arlington, MA (US); Matt Nestor, Norwell, MA (US)

(73) Assignee: Reekon Tools, Inc., East Boston, MA (US)

( * ) Notice: Subject to any disclaimer, the term of this patent is extended or adjusted under 35 U.S.C. 154(b) by 9 days.

(21) Appl. No.: 17/348,862

(22) Filed: Jun. 16, 2021

(51) Int. Cl.
*G01B 3/10* (2020.01)
*G01B 3/1069* (2020.01)
*G01B 3/1094* (2020.01)

(52) U.S. Cl.
CPC ......... *G01B 3/1069* (2020.01); *G01B 3/1094* (2020.01)

(58) Field of Classification Search
CPC .......................... G01B 3/1069; G01B 3/1094
USPC .................................................. 33/762, 763
See application file for complete search history.

(56) References Cited

U.S. PATENT DOCUMENTS

| | | | |
|---|---|---|---|
| 4,551,847 A * | 11/1985 | Caldwell | G01D 5/363 377/24 |
| 4,747,215 A * | 5/1988 | Waikas | G01B 7/026 33/763 |
| 5,027,526 A * | 7/1991 | Crane | G01D 5/34753 33/763 |
| 5,142,793 A | 9/1992 | Crane | |
| 5,208,767 A * | 5/1993 | George-Kelso | G01B 11/02 33/763 |
| 5,406,715 A * | 4/1995 | Koizumi | G01B 3/1004 33/771 |
| 5,433,014 A * | 7/1995 | Falk | G01D 5/347 455/67.11 |
| 5,983,514 A * | 11/1999 | Lindsey | G01B 3/1061 33/760 |
| 6,658,755 B2 * | 12/2003 | Arlinsky | G01B 3/1041 33/763 |
| 6,928,029 B2 * | 8/2005 | Rickman | G01S 17/86 33/760 |
| 7,401,416 B2 * | 7/2008 | Brooks | G01B 3/1084 33/630 |
| 11,156,445 B2 * | 10/2021 | Levisohn | G06K 19/06046 |
| 11,199,391 B2 * | 12/2021 | Wang | G01B 3/1061 |
| 11,359,902 B2 * | 6/2022 | Eun | G01B 21/045 |
| 2004/0040170 A1 | 3/2004 | Sanoner | |
| 2008/0072446 A1 | 3/2008 | Hu | |

(Continued)

*Primary Examiner* — George B Bennett
(74) *Attorney, Agent, or Firm* — David H. Judson

(57) ABSTRACT

A digital linear measuring device that digitizes the length of the extended tape and displays this measurement on a primary display screen that continually updates to a current measurement. The user can decide when to save a measurement, at which point the saved measurement will appear on a secondary screen (either a portion of the primary display, or a secondary adjacent display) as a previously taken measurement. These measurements can account for both an external measurement read from the tape measure, as well as an internal measurement, and the measurement may be adjusted where necessary to take into consideration the length of the device body. In use, there is no need to write down or remember a previous measurement, as they are displayed and easily accessible.

18 Claims, 9 Drawing Sheets

(56) References Cited

U.S. PATENT DOCUMENTS

2009/0271999 A1  11/2009  Alker
2015/0308807 A1  10/2015  Rhoden
2015/0331871 A1  11/2015  Bosch
2016/0040971 A1* 2/2016  Hoge .................... H04W 4/80
                                              33/760

* cited by examiner

Internal Measurement

External Measurment

DIGITAL LINEAR MEASURING DEVICE

BACKGROUND

Technical Field

This disclosure relates generally to measuring devices and methods.

Related Art

Measuring and layout are often used by individuals who are looking to both capture surrounding measurement information as well as laying out items to a specific location. While there are many tools and devices that can output measurements, oftentimes, transferring the measurement to the correct location relies on the physical shape and size of the measurement device to dictate what areas it can fit into and how close it needs to be to a given external surface or object. This can sometimes make it difficult to transfer a measurement or record a measurement based on the limitations of the measuring device's physical constraints. Additionally, having to move a measuring device location to location may result in lost time and less accuracy. A device is needed that allows for measurements to be recorded and/or marked without the physical limitations of the device itself.

Tape measures are one of the most common measurement devices in existence. Their use in the construction and home improvement industry is very common. Users often rely on a tape measure to collect a series of measurements which are then used to mark, cut, or otherwise manipulate various pieces of material. When collecting a series of measurements, there are often many sources of potential error when trying to recall a specific, previously obtained measurement. Measurements must be recorded somewhere or remembered by the user which may become confusing or hard to recall after one or more measurements are noted. This can often lead to confusion or need to spend additional time recording measurements on another surface requiring additional tools and time in order to do properly.

It is known in the prior art to augment a conventional tape measure device with measuring and processing components that enable greater accuracy to the measurements made by the device. One such example is Crane U.S. Pat. No. 5,142,793, which describes a digital tape measure device that comprises a housing, a reel located within a housing and a measuring tape wound on the reel. The measuring tape is extendable through an opening in the housing as the reel is rotated. An incremental measuring mechanism is associated with the reel for generating incremental measuring data. In addition, the device also includes an absolute measuring mechanism. The absolute measuring mechanism cooperates with the measuring tape for generating absolute measurement data as the measuring tape is extended. A processing unit is responsive to both the incremental measurement data and to the absolute measurement data for generating an output reflecting linear extension of the measuring tape from the housing, and a display is responsive to the processing unit for displaying information reflecting the linear extension of the measuring tape from the housing.

While measuring devices such as described above provide certain advantages, there remains a need to provide improvements in such devices and measurement techniques.

BRIEF SUMMARY

This disclosure describes a digital linear measuring device (e.g., a tape measure) that digitizes the length of the extended tape and displays this measurement on a primary display screen that continually updates to a current measurement. The user can decide when to save a measurement, at which point the saved measurement will appear on a secondary screen (either a portion of the primary display, or a secondary adjacent display) as a previously taken measurement. These measurements can account for both an external measurement read from the tape measure, as well as an internal measurement, and the measurement may be adjusted where necessary to take into consideration the length of the device body. In use, there is no need to write down or remember a previous measurement, as they are displayed and easily accessible.

In one example embodiment, a digital linear measuring device is described. The device comprises a housing, and a reel located within the housing and supporting a measuring tape wound on the reel. The housing has an opening through which the measuring tape is extendable as the reel is rotated, and the reel also supports a magnet that rotates with the reel. The device also includes an optical reader comprising a grid of light sources and detectors arranged to read a preconfigured pattern associated with indicia printed on the measuring tape. In this embodiment, the preconfigured pattern comprises an array composed of contiguous discrete rows, wherein a row is perpendicular to a longitudinal axis of the measuring tape. Each row along the pattern preferably includes first elements that together representing an absolute position along the pattern, and one or more second elements representing interpolation from the absolute position. The device also includes a rotary encoder (or, in the alternative, a small friction wheel) fixedly attached within the housing and positioned to read the magnet. A processor is configured in response to linear extension of the measuring tape from the housing to receive first data from the optical reader identifying the absolute position along the pattern, and to receive second data from the rotary encoder identifying the interpolation from the absolute position. Conveniently, the first data and the second data are obtained during reading a single row in the array. In response, the processor generates an output signal representing a measured distance. The device also includes a primary display that receives the output signal and displays information reflecting the measured distance, preferably on a continuous basis (continually updating to the current measurement). As noted above, the display preferably includes a first display portion (the primary) displaying the measured distance, and a second display portion (the secondary) displaying a previously-measured distance.

The foregoing has outlined some of the more pertinent features of the subject matter. These features should be construed to be merely illustrative. Many other beneficial results can be attained by applying the disclosed subject matter in a different manner or by modifying the subject matter as will be described.

DETAILED DESCRIPTION

Figure 1:
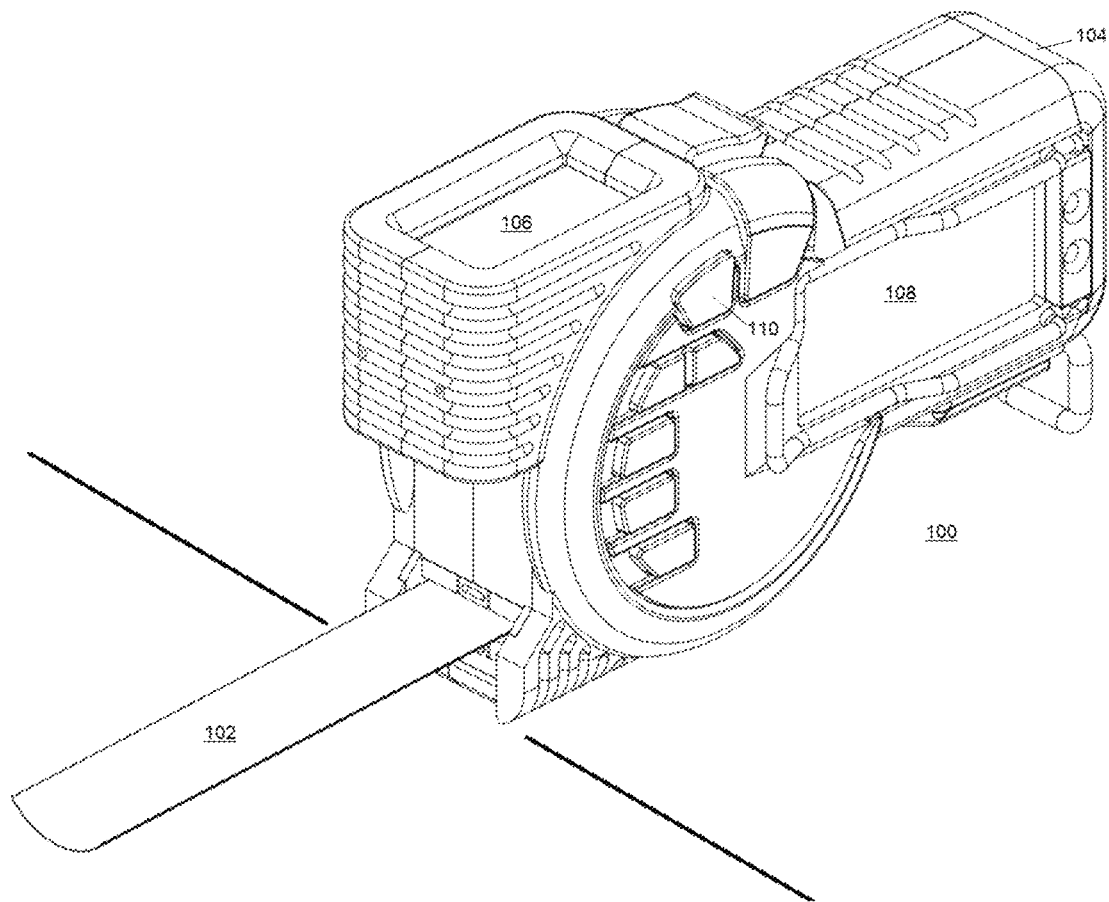
FIG. 1 is a perspective view of a measuring device of this disclosure depicting the first and second display(s) for displaying respective current and previous measurements.

FIG. 1 depicts a first embodiment of the measuring device 100 of this disclosure configured as a tape measure having an extensible tape measure 102. In this embodiment, and as depicted, the device 100 is configured to be held in an operator's hand, and it includes a housing 104 that encloses the operating elements. As also depicted, the housing 104 comprises a first display 106, which provides a "live" view corresponding to the measured distance (the extent to which the tape measure 102 is extended from the housing), as well as a second display 108, which provides a "stored measurement" view. Typically, the measurement data on the first display updates continuously on the first display 106 as the tape measure is extended. When the user decides to record/save a given measurement, he or she selects a control button 110, at which point the then-current indicated measurement is transferred from the live view (on the first display 106) to the stored measurement view, wherein it is then displayed on the second display 108. The second display may display one or more prior measurements. In one particular embodiment, up to five (5) prior measurements are displayed on the second display, preferably (left to right, or top to bottom) from oldest to newest. Although FIG. 1 depicts a preferred configuration wherein distinct first and second displays are used, a similar operation may be provided using a single physical display (such as side-mounted display 108) that has first and second distinct display portions. In an alternative embodiment, control commands (e.g., to record a measurement) may be issued by the user verbally. In this alternative embodiment, the device includes speech recognition software that recognizes the command and provides the requested response, e.g., recording the current measurement and saving it to the secondary display. In another variant embodiment, the device includes a transceiver that receives such control commands over the air (e.g., via Bluetooth, WiFi, etc.) issued from an external device (not shown). The transceiver may selectively transmit the recorded measurement to such external device. Using the first and second displays 106 and 108, the device provides for simultaneous display of live data, i.e., where the tape measure 102 is extended to now, along with previous data. This enables the operator to have all collected measurements visible at the same time, even as the live measurement is being taken and displayed.

Figure 2A:
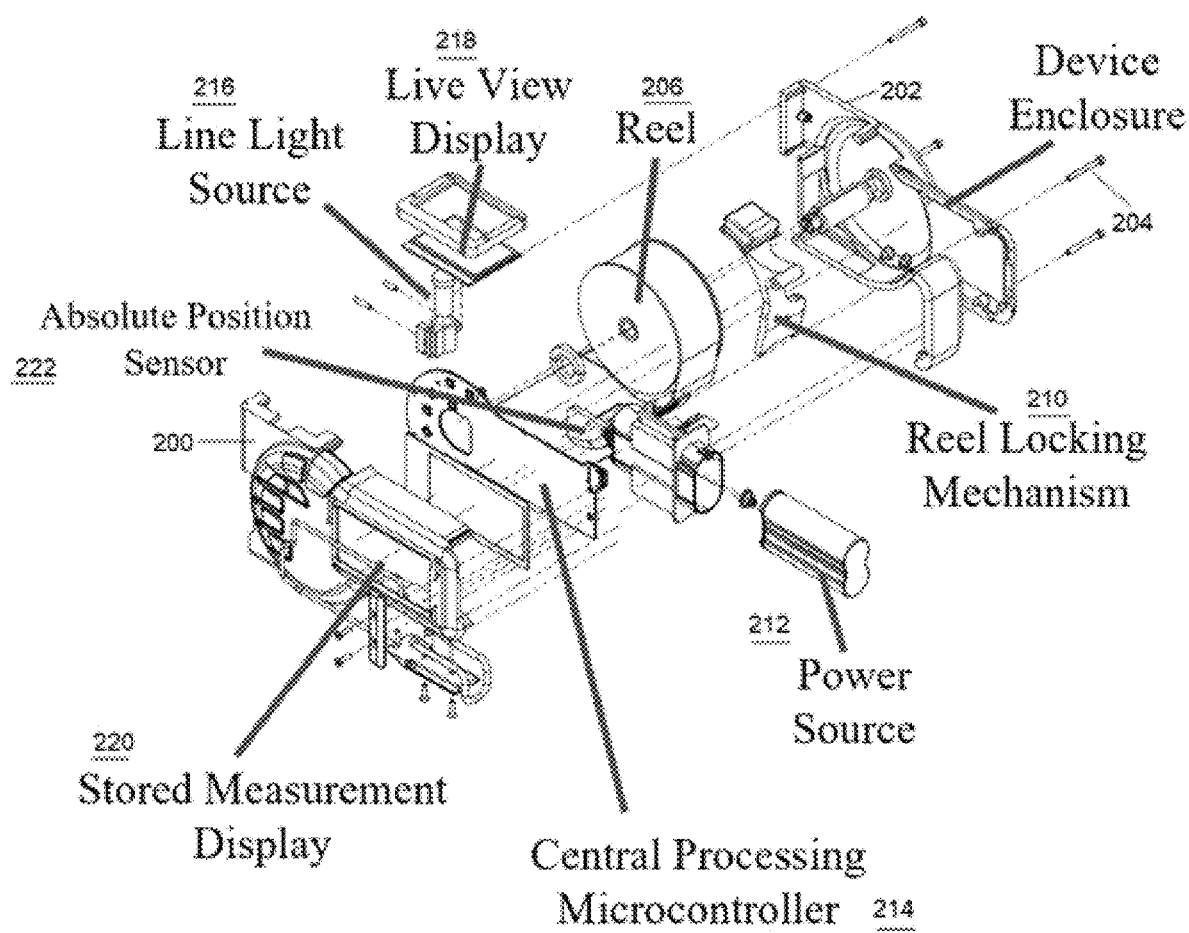
FIG. 2A is a first exploded view of the measuring device in FIG. 1, viewing from a first perspective.
Figure 2B:
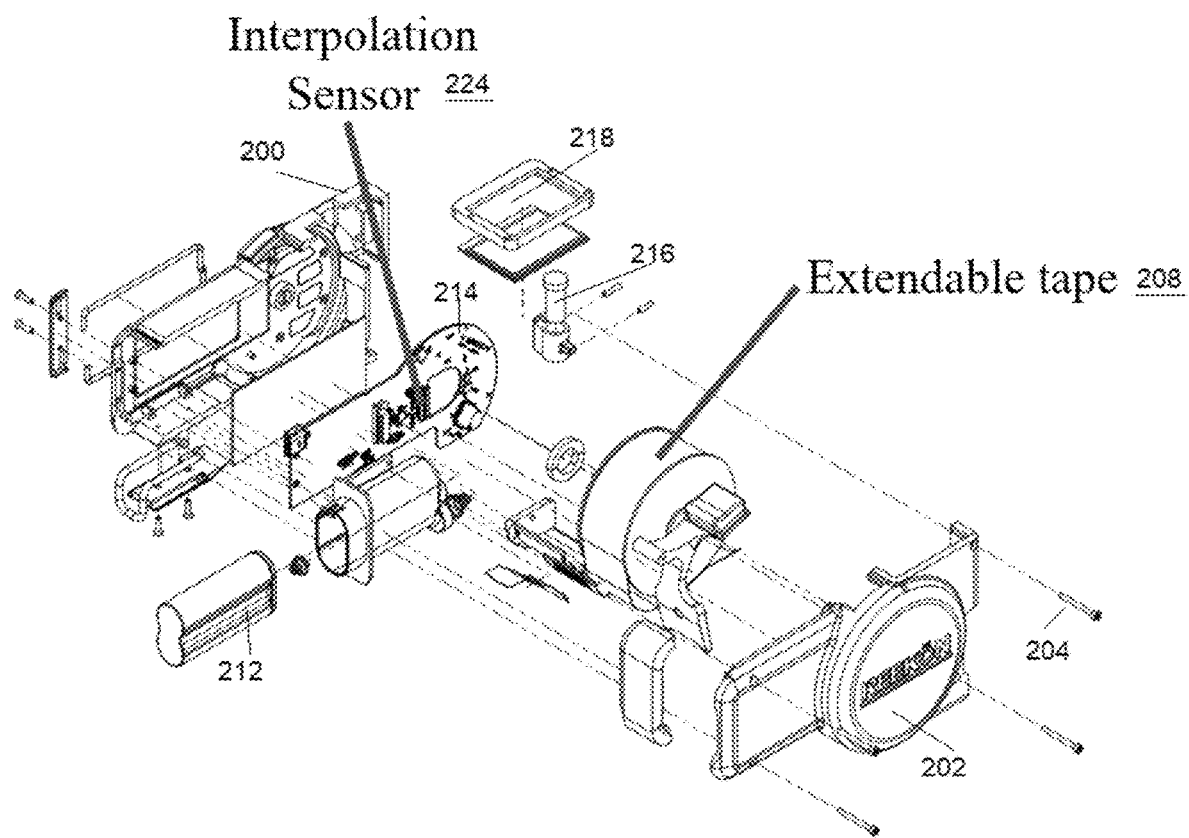
FIG. 2B is a second exploded view of the measuring device in FIG. 1, viewing from an opposite perspective from that shown in FIG. 2A.

FIGS. 2A and 2B depict the measuring device of FIG. 1 in exploded view, with the main operating components labeled. As shown, the housing comprises first and second device enclosures 200 and 202 that are mated together by fasteners 204. A reel 206 with extendable tape 208 is supported within the housing, and an associated reel locking mechanism 210 is used to maintain the tape at a given extended position (or to enable the extended tape to be retracted back within the housing). A power source 212 powers a central processing microcontroller 214, and a line light source 216 that is used to drive the live view display 218, and the stored measurement display 220. The housing also supports an absolute position sensor 222 and an interpolation sensor 224, and whose operations are described in more detail below.

Figure 3:
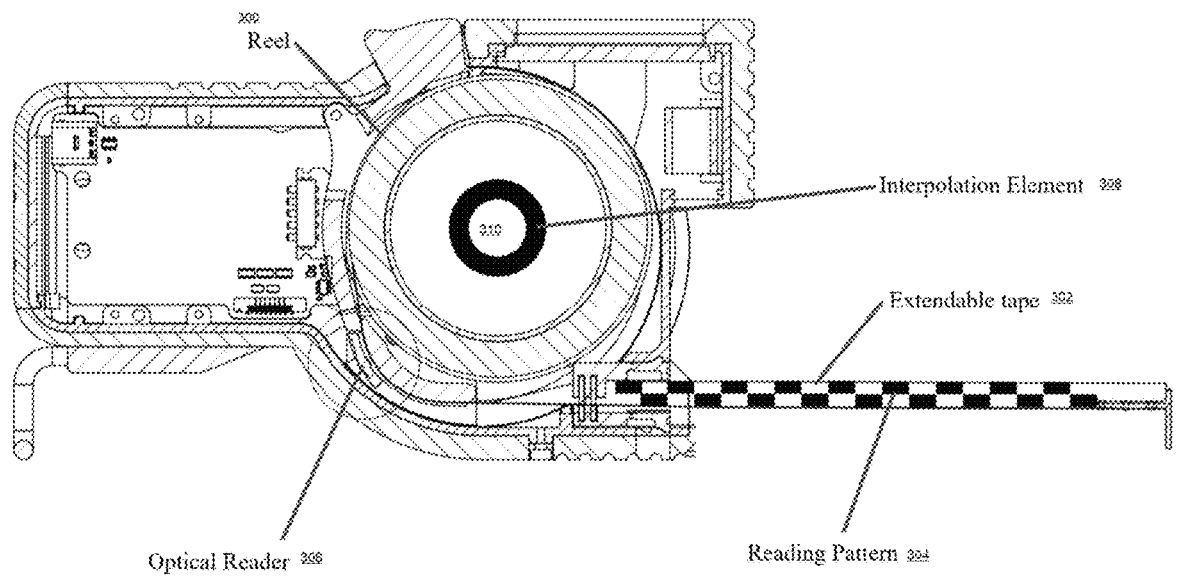
FIG. 3 depicts an internal, side view of the measuring device showing the positioning of the reel, and an associated optical reader.
Figure 4:
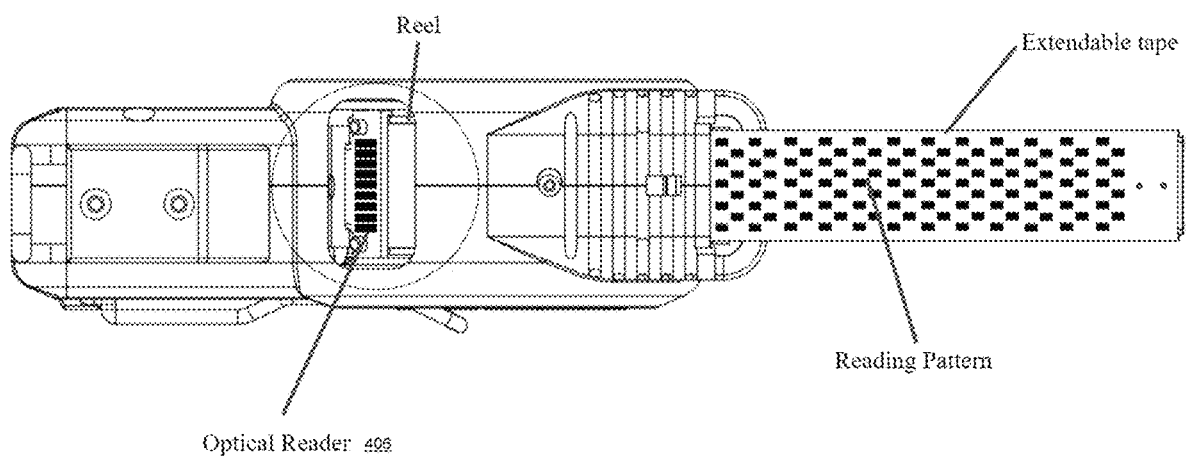
FIG. 4 depicts an internal, underside view corresponding to FIG. 3 showing the details of the optical reader.

FIG. 3 is a side view that depicts the reel 300 positioned with the sealed housing. As also shown in this internal view, the reel 300 supports the extendable measuring tape 302 having a reading pattern 304, the details of which are described below. The reading pattern 304 is read by optical reader, a portion 306 of which is visible in this view. FIG. 3 also depicts an interpolation element 308, which in this embodiment is a magnet positioned to rotate as a spindle 310 that supports the reel 300 rotates. The interpolation element 308 drives the interpolation sensor 224 depicted in FIGS. 2A and 2B. FIG. 4 is a bottom view corresponding to FIG. 3, and this view shows additional details of the optical reader 406.

Figure 5:
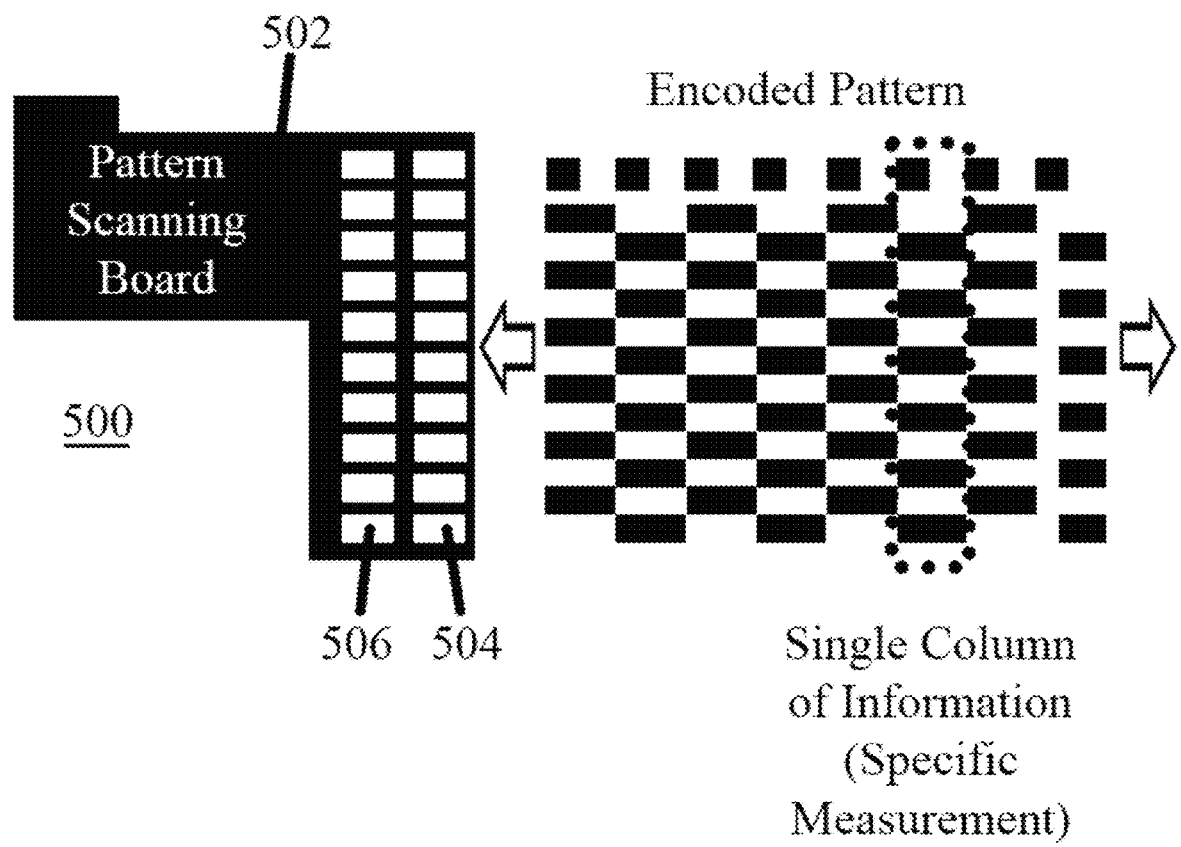
FIG. 5 depicts an optical reader of the measuring device and its use to read data from a reading pattern imprinted on the measuring tape.

FIG. 5 depicts the optical reader 500 in detail. The reader 500 comprise a flexible pattern scanning circuit board 502 on which a set of light sources 504, and a set of corresponding receivers 506 are mounted. The light sources typically are LEDs, and the receivers are phototransistors The LEDs are activated to illuminate the measuring tape printed pattern, and reflections from that pattern are received at the receivers and converted into electrical signals. Although the lights sources and detectors are shown as being a grid of discrete elements, this is not a limitation, as other configurations (e.g., single pixel arrays, photodetectors, etc.) may be used. As depicted, the sets of light sources 504 and receivers 506 are positioned perpendicularly relative to movement (up and down as shown in the drawing) of the measuring tape with its associated reading pattern. Thus, the grid of LEDs and phototransistors are arranged in a row to read multiple rows (columns) of printed patterns on the measuring tape and the tape moves over the optical reader. The LEDs are controlled/activated by the microcontroller, and the signals read by the receivers are returned back to the microcontroller. Computer software executing on the processor in the microcontroller converts these signals to the linear measurement, which is then stored/displayed. Preferably, the optical reader and the processor software include error checking routines to compensate for different sized patterns, damaged sections of the measuring tape, and other environmental, physical or other factors. The device may calibrate its optical pattern sensor by reading a repeating, known pattern (e.g., a checkerboard-like grid such as shown in FIG. 5) to ensure that it can read edges correctly.

Figure 6:
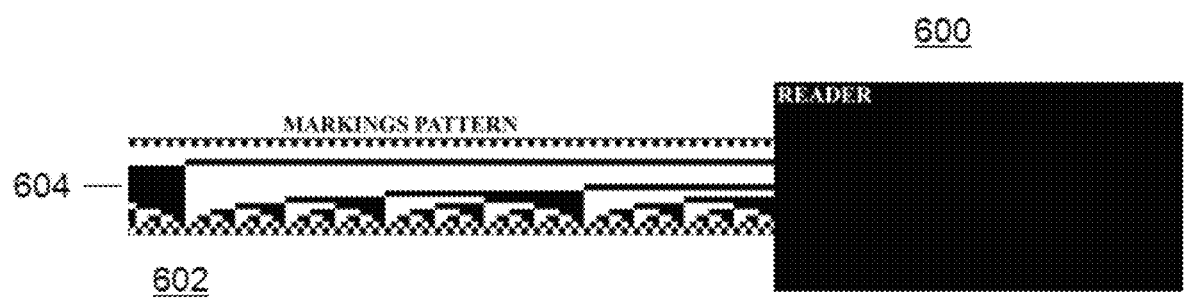
FIG. 6 depicts a preferred configuration of the reading pattern.
Figure 7:
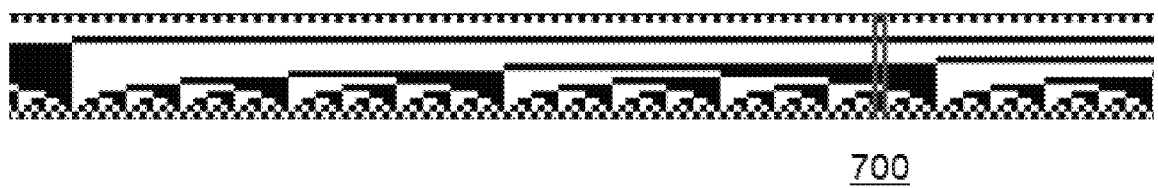
FIG. 7 depicts the reader reading a row of the reading pattern of FIG. 6.
Figure 8:
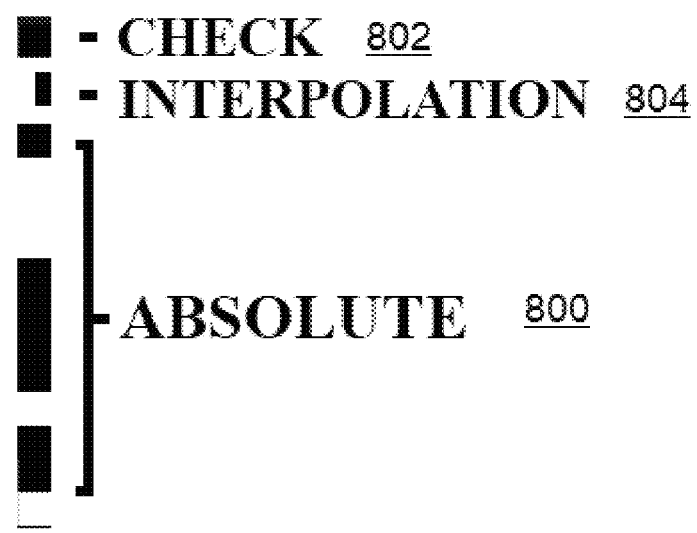
FIG. 8 depicts absolute, check and interpolation bits of a given row of the reading pattern.

FIG. 6 depicts a preferred configuration of the optical reader and its reading pattern. In this view, the tape 602 (which moves left to right, and vice versa) is shown relative to the optical reader 600. The tape 602 includes a reading pattern 604, which typically comprises many discrete elements. FIG. 7 depicts the reading of a single row 700 across the tape. Based on the pattern elements, a single row provides sufficient information to enable identification of an extent to which the measurement tape is extended from the housing. In this regard, and as a skilled person will appreciate, the size of the pattern elements themselves dictates the absolute (coarse) resolution that the reader can have. In order to obtain additional (more fine-grained resolution) from the pattern, preferably interpolation between rows is accomplished by including an additional marker correlating to a specific distance between two absolute elements. To this end, and as shown in FIG. 8, preferably the printed pattern includes (along a row) absolute bits 800, a check bit 802, and one or more interpolation bits 804. Absolute 800, check 802 and interpolation bits 805 may be present in each row of elements (with a row such as depicted in FIG. 7). The absolute elements are read together to provide an absolute position. The interpolation bit correlates to a specific distance traveled from an absolute row, and each row may have multiple interpolation elements. The check element, which is optional, may be used for enhanced error correction. These bits are identified in the light reflected back onto the phototransistors of the optical reader, converted to electrical signals, and then interpreted by the measuring routines embodied in the control software.

Typically, the printed pattern is marked on the measuring tape and human-visible, but this is not a requirement. In an alternative embodiment, the printed pattern itself is not necessarily human-visible but instead is printed in non-visible ink and exposed/detected by reflecting UV or infrared light thereon. The device itself may carry the light source that generates such light. As another variant, the printed pattern may comprise both human-visible and non-visible ink/markings.

Figure 9:
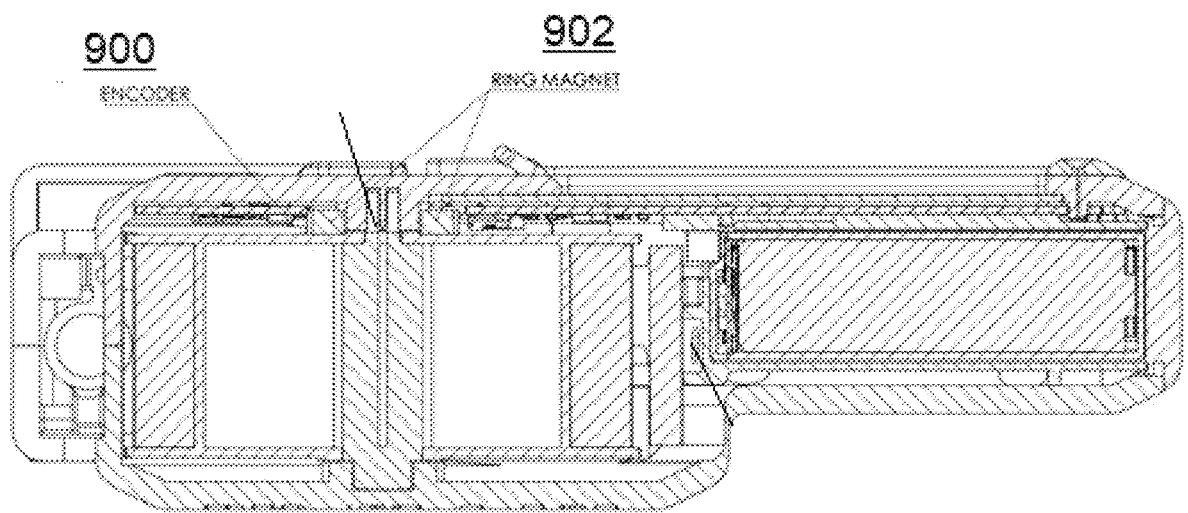
FIG. 9 depicts a rotary encoder that is used to provide interpolation measurements according to a preferred implementation.

Depending on implementation and how the device will be used, the optical reader itself (which typically reads the absolute position) may not provide sufficient accuracy. In such case, the device may include additional measuring elements. In particular, and as depicted in FIG. 9, the device includes a rotary encoder 900 attached to a stationary position on the housing (not shown) and that is used to read a position of a magnet 902 rotating with the reel. In this embodiment, the encoder includes a friction wheel that carries the encoder. The friction wheel remains in contact with the tape itself as the tape is extended/retracted, and it converts the rotary motion to the distance of the tape traveled. In such case, preferably the encoder 900 operates in association with the interpolation element (in FIGS. 2A and 2B) to achieve greater resolution in between signals of the optical bits (the information read by the optical reader). The encoder may also be implemented using an optical (as opposed to magnetic) element.

In a preferred implementation, both the optical reader and the encoder are utilized to read the pattern on the measuring tape. The optical reader comprises a grid of light sources and detectors (FIG. 5) arranged to read a preconfigured pattern associated with indicia printed on the measuring tape, As depicted in FIGS. 7-8, the preconfigured pattern comprises an array composed of contiguous discrete rows, wherein a row is perpendicular to a longitudinal axis of the measuring tape, each row along the pattern including first elements (e.g., absolute bits 800 in FIG. 8) which together representing an absolute position along the pattern, and one or more second elements (e.g., interpolation bits 804) representing interpolation from the absolute position. In this embodiment, the encoder is fixedly attached within the housing and positioned to read a magnet. As noted above, the encoding may be carried out by mechanisms (optical or otherwise) that do not require a magnet. Regardless of how the encoder is implemented, a processor is configured in response to linear extension of the measuring tape from the housing to receive first data from the optical reader identifying the absolute position along the pattern, and to receive second data from the encoder identifying the interpolation from the absolute position. As shown in FIG. 7, preferably the first data and the second data are obtained from a single row in the array. In response, the processor generates an output signal representing a measured distance. This output signal is converted into a measurement that is then displayed in the live view, preferably continuously as the tape measure moves. That measurement may then be captured by the user entering a control command (e.g., by pushing a control button).

Figure 10:
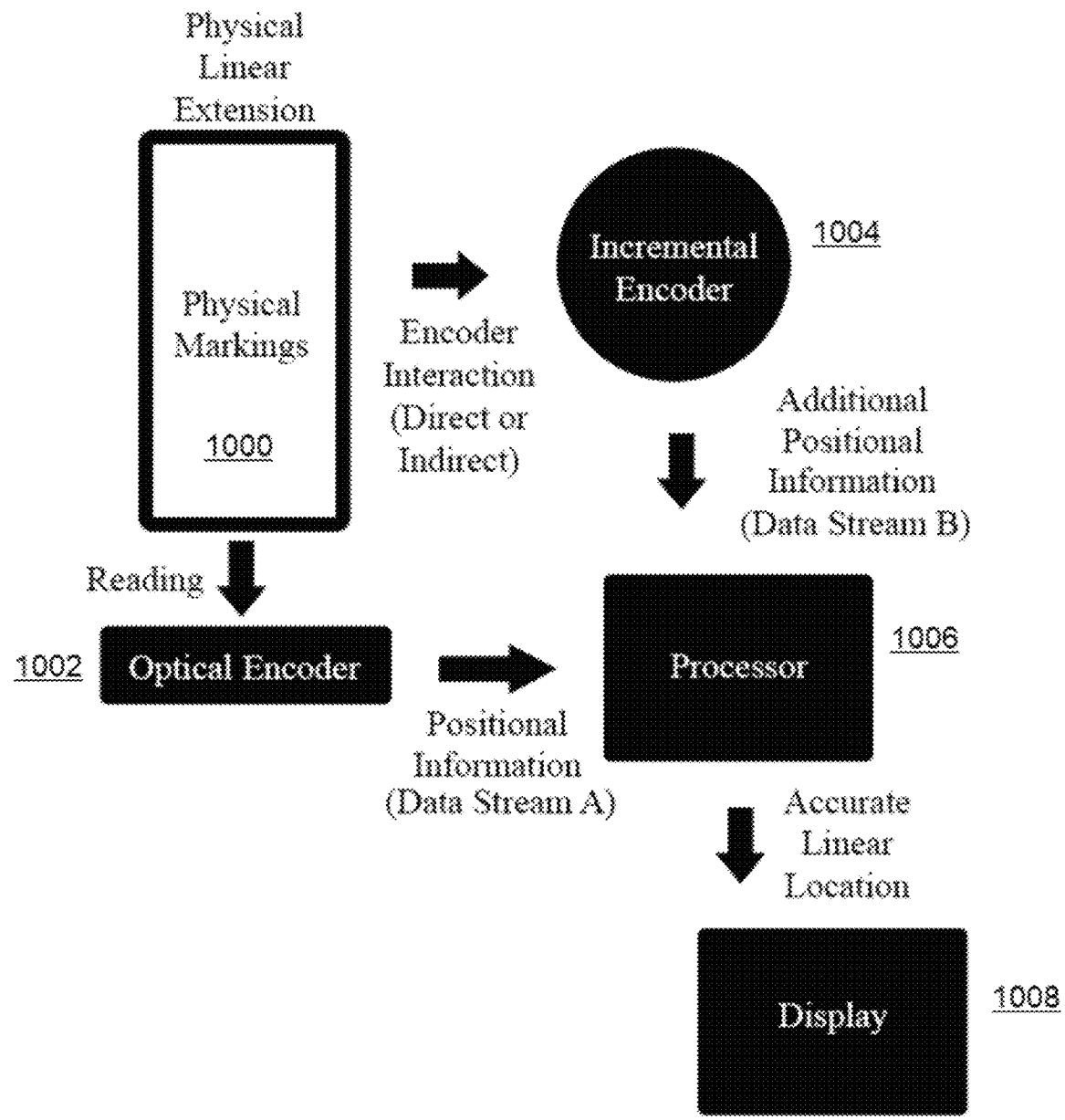
FIG. 10 depicts a block diagram depicting the various control signaling provided to a processor that outputs control signals to drive an output display.

The control software executed by the processor on the microcontroller provides for conversion of the electrical signals read from the various measuring elements into a measurement that is then displayed on the primary display. FIG. 10 depicts this control functionality in additional detail. As shown, physical markings 1000 representing the physical linear extension of the measuring tape are read by the optical encoder 1002, and the incremental encoder 1004. The devices are coupled to the processor 1006 that is under program control. The optical encoder 1002 provides a first data stream A to the processor representing positional information. The incremental encoder 1004, and based on direct or indirect interaction with the markings, provides additional positional information as a second data stream B to the processor. The processor is configured to process the received positional information and generate an accurate linear location, which is then output (as a control signal) to drive the display 1008. In a variant embodiment, the processor software may determine to rely on the incremental encoder 1006 over the absolute encoding that is provided by the optical encoder 1002, e.g., based on signal feedback where the likelihood of error being present in the measurement is high (or above some configurable threshold). For example, the likelihood of error may be high when expectations for seeing certain signals or markers (based on programming and/or calibration) are missed after predetermined amounts of time or distance traveled. This may occur where there are scratches or marks or obstructions to one of the sensors.

Figure 11:
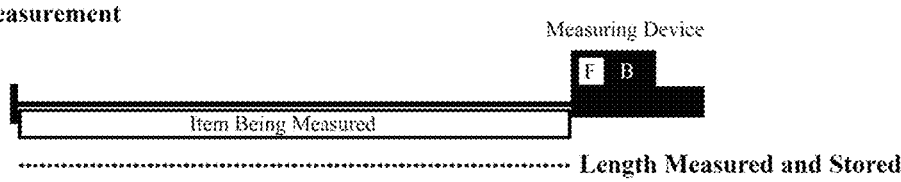
FIG. 11 depicts different ways in which the measuring device may be used depending on the physical environment in which a measurement is being taken.
Figure 11:
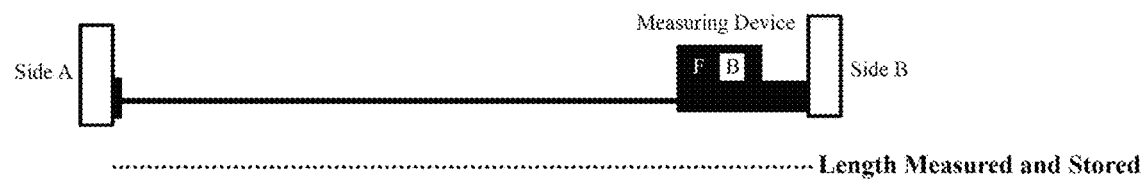

Depending on the physical environment in which the measurement is being taken, the device may be configured to take different types of measurements. This is illustrated in FIG. 11. In the usual case, shown at the top, the physical environment is sufficiently accessible such that the length of tape extended (tip to front of the tape measure) represents the total distance measurement that is desired. This is sometimes referred to as an external measurement. If, however, and as shown at the bottom, there is insufficient clearance to position the device for such an external measurement, an internal measurement is taken. In such case, the total distance measuring is calculated as the length of tape extended plus the length of the body of the tape measure itself. For recording such measurements, preferably the device housing supports two control buttons. When a first control button is depressed, the external measurement is taken; when the second control button is depressed the internal measurement is taken (in which case the length of the tape measure is added to the measurement corresponding to the physical linear extension).

More generally, The user sends commands to the device physical buttons or verbally as to when to record a measurement. As noted, measurements are taken from the live view display screen and selectively moved to a location on a secondary display or area. By using a secondary display, prior measurement(s) need not be toggled to replace the live view display measurement, or vice versa. The use of this multiple display screens/areas enables simultaneous display of live data, i.e., where the tape measure is extended to presently, along with previous data (the collected measurements). The device may also be controlled, e.g., over-the-air, or directly via wired connection, by an external tool or device. Also, measurements may be transmitted, either over-the-air, or over that direct connection, to some external device or system, such as a smart phone, smart watch, other computing device, or other "smart" work tool.

The device may be calibrated by measuring a block of known distance and then telling the device what that distance is. The onboard computer may then calculate and correlate this user input distance to the data from both encoders to scale and record this measurement and ensure it is always reading accurately.

The described control functionality may be practiced, typically in software, on one or more hardware processors, in firmware, or via other controllers. Generalizing, a microcontroller typically comprises commodity hardware and software, storage (e.g., disks, disk arrays, and the like) and memory (RAM, ROM, and the like), network interfaces and software to connect the machine to a network in the usual manner, and the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

The optical reader may read a pattern printed on the top or underside of the measurement tape.

Having described the subject matter, what we now claim is set forth below.

The invention claimed is:

1. A digital linear measuring device, comprising:
   a housing;
   a reel supporting a measuring tape wound on the reel, the housing having an opening through which the measuring tape is extendable as the reel is rotated;
   an optical reader comprising a grid of light sources and detectors arranged to read a preconfigured pattern associated with indicia printed on the measuring tape, the preconfigured pattern comprising an array composed of contiguous discrete rows, wherein a row is perpendicular to a longitudinal axis of the measuring tape, each row along the pattern including first elements which together representing an absolute position along the pattern, and one or more second elements representing interpolation from the absolute position;
   an encoder;
   a processor configured in response to linear extension of the measuring tape from the housing to receive first data from the optical reader identifying the absolute position along the pattern, and to receive second data from the encoder identifying the interpolation from the absolute position, the first data and the second data being obtained from a single row in the array, and in response generating an output signal representing a measured distance; and
   a display that receives the output signal and displays information reflecting the measured distance.

2. The digital linear measuring device as described in claim 1 wherein the preconfigured pattern is printed on the measuring tape.

3. The digital linear measuring device as described in claim 2 wherein the preconfigured pattern is human-visible.

4. The digital linear measuring device as described in claim 2 wherein the preconfigured pattern is not human-visible.

5. The digital linear measuring device as described in claim 4 further including a light source that generates a light, the light being directed on the pattern to render the preconfigured pattern human-visible.

6. The digital linear measuring device as described in claim 5 wherein the light exposes non-visible ink and is one of: ultraviolet light and infrared light.

7. The digital linear measuring device as described in claim 1 wherein the preconfigured pattern is projected onto the measuring tape.

8. The digital linear measuring device as described in claim 1 wherein one or more rows along the pattern also include third elements representing check bits.

9. The digital linear measuring device as described in claim 1 wherein the display comprising a first display portion, and a second display portion, the first display portion displaying the measured distance, and the second display portion displaying a previous measured distance.

10. The digital linear measuring device as described in claim 1 further including a communications interface associated with the processor and configured to output the measured distance to an external device.

11. The digital linear measuring device as described in claim 10 wherein the communications interface is one of: a physical network connection, and a wireless transmitter.

12. The digital linear measuring device as described in claim 1 wherein the encoder is a rotary encoder fixedly attached within the housing and positioned to read a magnet that rotates with the reel.

13. The digital linear measuring device as described in claim 1 wherein the encoder is an optical encoder.

14. The digital linear measuring device as described in claim 1 wherein the processor also performs error checking on one of the first data and the second data to compensate for any physical damage to the measuring tape.

15. The digital linear measuring device as described in claim 1 further including augmenting the measured distance to include a length of the measuring device.

16. The digital linear measuring device as described in claim 1 further including preferencing the second data over the first data to generate the measured distance when a likelihood of error associated with a measurement is determined to exist.

17. A digital linear measuring device, comprising:
   a housing;
   a reel located within the housing and supporting a measuring tape wound on the reel, the measuring tape having a measuring pattern;
   a processor configured in response to linear extension of the measuring tape from the housing to receive data read from the measuring pattern and continuously generate output signals representing measured distances; and a first display area that continuously displays live measurements reflecting the measured distances as the measuring tape is extended;

wherein the processor is further configured in response to receipt of a control command to transfer a current live measurement from the first display area to a second display area.

18. The digital linear measuring device as described in claim 17 wherein the first and second display areas are first and second different displays.

* * * * *